(12) United States Patent
Zätterqvist (10) Patent No.: US 11,685,526 B2
(45) Date of Patent: Jun. 27, 2023

(54) EJECTING SYSTEM, METHOD AND VEHICLE

(71) Applicant: SAAB AB, Linköping (SE)

(72) Inventor: Christer Zätterqvist, Uppsala (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 17/809,084

(22) Filed: Jun. 27, 2022

(65) Prior Publication Data

US 2023/0002053 A1  Jan. 5, 2023

(30) Foreign Application Priority Data

Jul. 1, 2021 (SE) .................................... 2100111-0

(51) Int. Cl.
*B64D 1/02* (2006.01)
*B64D 7/00* (2006.01)

(52) U.S. Cl.
CPC ................ *B64D 1/02* (2013.01); *B64D 7/00* (2013.01)

(58) Field of Classification Search
CPC ... B64D 1/02; B64D 1/04; B64D 1/06; B64D 7/00; F41H 11/02
See application file for complete search history.

(56) References Cited

U.S. PATENT DOCUMENTS

| | | | | |
|---|---|---|---|---|
| 2,859,896 A | * | 11/1958 | Johnson | ........... F42B 12/70 221/244 |
| 2,954,948 A | * | 10/1960 | Johnson | ........... F41H 11/02 221/277 |
| 4,161,301 A | * | 7/1979 | Beardsley | ........... B64D 1/10 89/1.51 |
| 4,679,483 A | | 7/1987 | Wranå | |

(Continued)

FOREIGN PATENT DOCUMENTS

| | | | | |
|---|---|---|---|---|
| EP | 2157398 A2 | * | 2/2010 | ........... F41A 23/24 |
| EP | 2219008 A2 | * | 8/2010 | ........... F41A 23/20 |

(Continued)

OTHER PUBLICATIONS

Swedish Patent and Registration Office, Office Action, including Search Report, received for Application No. SE 2100111-0, dated Feb. 9, 2022, 8 pages, Sweden.

(Continued)

*Primary Examiner* — Benjamin P Lee
(74) *Attorney, Agent, or Firm* — Alston & Bird LLP (57) ABSTRACT

The present disclosure relates to an ejecting system (1) for dispensing countermeasure. The system (1) comprising at least one magazine (2) comprising at least one expendable cartridge (3) and a transporting rack (4) extending in a first direction (D1). Further, the system (1) comprises a magazine feeding mechanism (5) arranged to cooperate with said transporting rack (4) to move each of the at least one magazines (2) from a stored position to a loaded position. Further, the system (1) comprises a dispensing means (6) arranged to hold said at least one magazine (2) when said at least one magazine (2) is in a loaded position, wherein the dispensing means (6) comprises an electrical connector arrangement (7). Moreover, the system (1) comprises a first positioning mechanism (8) arranged to move said dispensing means (6) and the at least one magazine (2) from the loaded position to a protruding position.

20 Claims, 9 Drawing Sheets

(56) References Cited

U.S. PATENT DOCUMENTS

| | | | | |
|---|---|---|---|---|
| 5,381,721 A * | 1/1995 | Holmstrom | | F41H 11/02 |
| | | | | 89/1.51 |
| 6,347,567 B1 * | 2/2002 | Eckstein | | B64D 1/04 |
| | | | | 89/1.801 |
| 6,539,833 B1 * | 4/2003 | Zatterqvist | | F41F 5/00 |
| | | | | 89/1.51 |
| 7,600,477 B2 * | 10/2009 | Zatterqvist | | F41F 3/065 |
| | | | | 89/1.816 |
| 8,033,225 B2 * | 10/2011 | Friede | | F41F 7/00 |
| | | | | 102/505 |
| 8,695,847 B2 * | 4/2014 | Sjobeck | | F42B 5/15 |
| | | | | 102/505 |
| 8,985,518 B2 * | 3/2015 | Zatterqvist | | F42B 12/70 |
| | | | | 244/53 B |
| 9,045,228 B2 * | 6/2015 | Melin | | B64D 1/02 |
| 9,501,055 B2 * | 11/2016 | Kolanek | | F42B 15/01 |
| 9,851,183 B2 * | 12/2017 | Melin | | B64D 1/02 |
| 10,683,092 B2 * | 6/2020 | Zaetterqvist | | B64D 7/06 |
| 10,696,401 B2 * | 6/2020 | Zaetterqvist | | B64D 1/02 |
| 11,143,481 B2 * | 10/2021 | Bies | | B64D 1/04 |
| 2009/0084253 A1 * | 4/2009 | Bellino | | F41H 11/02 |
| | | | | 89/1.51 |
| 2009/0120955 A1 * | 5/2009 | Friede | | F41F 7/00 |
| | | | | 221/282 |
| 2010/0326263 A1 * | 12/2010 | Stevenson | | B64D 1/04 |
| | | | | 89/1.51 |
| 2012/0012605 A1 * | 1/2012 | Melin | | B64D 1/02 |
| | | | | 221/87 |
| 2012/0012608 A1 * | 1/2012 | Sjobeck | | F41F 5/00 |
| | | | | 221/246 |
| 2012/0018581 A1 * | 1/2012 | Melin | | B64D 7/00 |
| | | | | 244/137.1 |
| 2012/0055949 A1 * | 3/2012 | Stenfelt | | F42B 39/08 |
| | | | | 206/524.1 |
| 2012/0097795 A1 * | 4/2012 | Zatterqvist | | F41F 3/065 |
| | | | | 244/136 |
| 2013/0167711 A1 * | 7/2013 | Zatterqvist | | F42B 12/70 |
| | | | | 89/1.56 |
| 2019/0092469 A1 * | 3/2019 | Zaetterqvist | | F42B 5/15 |
| 2019/0137220 A1 * | 5/2019 | Zaetterqvist | | F42B 5/155 |
| 2019/0193857 A1 * | 6/2019 | Zätterqvist | | B64D 7/06 |
| 2019/0283878 A1 * | 9/2019 | Zaetterqvist | | F42B 12/70 |
| 2021/0316860 A1 * | 10/2021 | Bystroem | | B64D 1/12 |
| 2022/0026179 A1 * | 1/2022 | Kolanek | | G01S 13/426 |
| 2022/0234735 A1 * | 7/2022 | Zätterqvist | | F41H 11/02 |

FOREIGN PATENT DOCUMENTS

| | | | | | |
|---|---|---|---|---|---|
| EP | | 2157398 A3 * | 7/2012 | | F41A 23/24 |
| EP | | 3458797 A4 * | 12/2019 | | B64D 1/02 |
| FR | | 3052551 A1 * | 12/2017 | | |
| GB | | 2410542 A | 8/2005 | | |
| JP | | 2005-172363 A | 6/2005 | | |
| WO | WO 2010/082881 A1 | | 7/2010 | | |
| WO | WO-2017200454 A1 * | | 11/2017 | | B64D 1/02 |
| WO | WO 2020/036519 A1 | | 2/2020 | | |
| WO | WO 2020/246931 A1 | | 12/2020 | | |
| WO | WO-2020246931 A1 * | | 12/2020 | | B64D 1/02 |
| WO | WO 2021/112729 A1 | | 6/2021 | | |

OTHER PUBLICATIONS

European Patent Office, Extended European Search Report received for Application No. 22180242.4, dated Dec. 1, 2022, 8 pages, Germany.

* cited by examiner

EJECTING SYSTEM, METHOD AND VEHICLE

CROSS REFERENCE TO RELATED APPLICATIONS

This application claims priority to and the benefit of Swedish Application No. 2100111-0, filed Jul. 1, 2021; the contents of which as are hereby incorporated by reference in their entirety.

TECHNICAL FIELD

The present disclosure relates to an ejecting system, a vehicle comprising such an ejecting system and a method for preparing at least one magazine for a countermeasure operation from said ejecting system.

BACKGROUND ART

Ejecting systems are commonly used to dispense countermeasures from vehicles, specifically from aircrafts. For instance, helicopters, transport and fast jet aircraft may be provided with various types of ejecting systems for dispensing countermeasure means. Such countermeasure means may comprise radar reflecting aluminized foil, free-fall radio frequency jammers and hot IR decoys to confuse and divert any means that may be targeted towards the vehicle.

Major parts of the ejecting systems and specifically theft magazines are often enclosed in capsules or cases arranged under the wings, in or under the fuselage of a vehicle. Specifically, the ejecting systems and major parts thereof are fixed mounted in a fixed dispensing direction.

However, the dispensing operation is used only when the vehicle is exposed for threats. Thus, the dispensing unit may be inactivated during a long period of time. Under such period the countermeasures within the dispenser unit might be exposed to air flow and water or particles in the air flow which may come into the parts of the ejecting system and reach the countermeasures, and as a result damage the countermeasures. Moreover, dispensing units arranged externally contribute to increased aerodynamic drag and increased radar cross section. Further, ejecting systems in the market today are usually loaded with expendables prior to flight and cannot be re-loaded during a flight. Thus, the ejecting system has a limited amount of expendables which may result in that a vehicle is susceptible to threats when said expendables are dispensed.

Based on the above, there is in the present art room for improvements in order to have ejecting systems that allow for a compact arrangement in a vehicle, efficient loading of the ejecting systems with expendables (so to prepare a dispensing operation), and a flexible dispensing mechanism that allow for handling of a larger quantity of expendables.

Thus, there is room for ejecting systems in the present art to explore the domain to provide improved ejecting systems that are able to be compactly mounted in a vehicle that can handle a great quantity of magazines with expendables, that are flexible in dispensing and that are efficient in the loading.

Even though some currently known solutions work well in some situations it would be desirable to provide an ejecting system that specifically fulfills requirements relating to efficiency, flexibility and compactness.

SUMMARY

It is therefore an object of the present disclosure to provide an ejecting system, a vehicle comprising an ejecting system and a method for preparing at least one magazine for a countermeasure operation from an ejecting system to mitigate, alleviate or eliminate one or more of the above-identified deficiencies and disadvantages.

This object is achieved by means of methods, a vehicle, and an ejecting system as defined in the appended claims 1, 14 and 18.

The present disclosure is at least partly based on the insight that by providing an improved ejecting system with focus on loading efficiency, compactness and flexibility, the ejecting systems will be improved in terms of having a better performance (by the flexibility and compactness) and provide enhanced endurance (by being reloadable).

The present disclosure provides an ejecting system for dispensing countermeasure comprising at least one magazine comprising at least one expendable cartridge, wherein the at least one magazine comprises a transporting rack extending in a first direction. Further, the ejecting system comprises a magazine feeding mechanism arranged to cooperate with said transporting rack to move each of the at least one magazines from a stored position to a loaded position. Further, the ejecting system comprises a dispensing means arranged to hold at least one magazine when said at least one magazine is in a loaded position, wherein the dispensing means comprises an electrical connector arrangement attachable to said magazine.

Moreover, the ejecting system comprises a first positioning mechanism arranged to move said dispensing means and the at least one magazine from the loaded position to a protruding position.

A benefit of the present disclosure is that the ejecting system is able to reload the dispensing means by said feeding mechanism. After the expandable cartridges are dispensed, additional magazines may be fed in to the dispensing means.

Further, the ejecting system is compact and may be fully mounted inside a vehicle by having a positioning mechanism that may protrude the dispensing means. Consequently, the ejecting system does not contribute to aerodynamic drag or radar cross section when not in use.

Upon transitioning said dispensing means and the at least one magazine from the loaded position to the protruding position, the at least one magazine may move along a second direction essentially perpendicular to the first direction. It should be noted that the second direction may in some embodiments have an angle of 0-90 degrees relative the first direction.

The dispensing means may comprises an eccentric mechanism arranged to, by engaging to said transporting rack, attach said magazine to said electrical connector arrangement. However, in some embodiments, the eccentric mechanism is arranged to attach said magazine to said electrical connector arrangement without association to said transporting rack.

The eccentric mechanism allows for a convenient igniting means for a plurality of expandable cartridges.

The electrical connector arrangement may ignite expandable countermeasures in each of said expandable cartridges. Further, the electrical connector arrangement may determine the number of expandable cartridges that are available in a magazine. Further, the electrical connector arrangement may, based on a control signal, ignite at least one expandable cartridge.

Thus after a dispensing means received a magazine, it may attach the electrical connector arrangement to said magazine.

The magazine feeding mechanism and said transporting rack may cooperate/engage by means of a rack and pinion mechanism, wherein the magazine feeding mechanism comprises at least one rotating pinion engaging with a corresponding linear gear on said transporting rack.

A benefit of this is that it provides an efficient mechanism for feeding magazines to said dispensing means allowing for a convenient reloading of the dispensing means.

Each magazine may comprises a connector contact surface and an opposing dispensing surface. The connector contact surface may be arranged to contact connector pins so to allow for igniting the expendable cartridges in the magazine and the dispensing surface allows for dispensing the expendable cartridges.

Each magazine may comprises a first axis extending along the first direction and a second axis extending in a second direction, wherein said dispensing means comprises a second positioning mechanism configured to, when in said protruding position, rotate said magazine about at least one of the first and the second axis. The first axis may be a transversal axis of said magazine extending transversally along the transporting rack, wherein the second axis may be predominantly perpendicular to the first axis and extending from a dispensing surface to a connector contact surface.

The rotation allows for flexibility in the dispensing direction of the countermeasures. Thus, the dispensing surface may be angled and aimed at any suitable position.

The ejecting system may comprise a hatch, enclosing at least the dispensing means within a storage compartment, the hatch being configured to be open when said dispensing means is in a protruded position and to close when said dispensing means is in an initial position.

The dispensing means may comprise a bracket and a magazine housing adapted to hold said magazine, and wherein the magazine housing is provided with a launch opening (on said dispensing surface), wherein said second positioning mechanism is arranged to rotate the bracket with respect to a first rotational axis, and rotate the magazine housing with respect to a second rotational axis. The first rotational axis may be conjoined with the second axis of said magazine when said dispensing means holds said magazine, and wherein the second rotational axis may be conjoined with said first axis of said magazine when said dispensing means holds said magazine. In other words, the dispensing means may rotate the magazine with 2 degrees of freedom.

The first positioning mechanism may further be arranged to retract the dispensing means to an initial position after a dispensing operation so to allow additional of the plurality of magazines to move from a stored position to a loaded position.

A benefit of this is that it allows for reloading of the dispensing means with additional magazines after a dispensing operation has been performed.

The at least one expandable may comprise expendable countermeasure.

The at least one magazine is, when in said storing position, arranged along a common row in a storage compartment extending in said first direction towards said dispensing means (6). Thus, the magazines are in close connection to said dispensing means allowing for a rapid reloading. The magazines may be arranged along several rows.

The ejecting system may be fully enclosed in a storage compartment (in a body of e.g. a vehicle), wherein said storage compartment comprises a hatch, enclosing at least the dispensing means within said storage compartment, the hatch being configured open in order to allow said dispensing means to move into a protruded position.

A benefit of this is that the hatch allows for the ejecting system to be arranged in a compact manner in e.g. a vehicle. Further, allows the ejecting system to be implemented so to be hidden from an exterior of e.g. the body of a vehicle.

There is further provided a vehicle comprising the ejecting system in accordance with the present disclosure.

The said magazines may be provided in a storage compartment inside the body of said vehicle when in said storing position and in said loaded position, and wherein a magazine (loaded in the dispensing means) protrude outwardly from an opening of said body when in said protruded position.

Thus, a large quantity of magazines may be stored in a storage compartment inside the body of said vehicle and be loaded on the dispensing means automatically after each dispensing operation.

The opening may be enclosed by a hatch (or a door means) when in said storing position and in said loaded position, wherein said hatch is opened in said protruded position. Thus, allowing for the ejecting system to be integrated within a body of a vehicle without contributing to aerodynamic drag or radar cross section when not in use.

There is further disclosed a method for preparing at least one magazine for a countermeasure operation from an ejecting system in accordance with any aspect herein, wherein the method comprises the steps of: Firstly, actuating the magazine feeding mechanism, so to transport the at least one magazine in a first direction. Further, the dispensing means receives the at least one magazine. Further, the ejecting system locks the magazine in said dispensing means, wherein the electrical connector arrangement engages with said magazine. Further, the ejecting system movies the magazine, by means of said first positioning mechanism, to said protruded position. Moreover, the dispensing means may in some embodiments herein comprise the step of rotating said magazine about at least one of a first and a second axis of the magazine.

I should be noted that the method may interchangeably also be directed to "A method for preparing an ejecting system for a countermeasure operation".

Thus the method allows the magazines to be loaded to said dispensing means and angled at a desired direction prior to being ignited by the connector arrangement.

The method may further comprising the step of, preceding moving the magazine to said protruding position, opening a hatch enclosing said dispensing means within a compartment.

BRIEF DESCRIPTION OF THE DRAWINGS

In the following the disclosure will be described in a non-limiting way and in more detail with reference to exemplary embodiments illustrated in the enclosed drawings, in which.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided method, system and vehicle, it will be apparent to one skilled in the art that the method, system and vehicle may be realized without these details. In other instances, well known constructions or functions are not described in detail, so as not to obscure the present disclosure.

Figure 1:
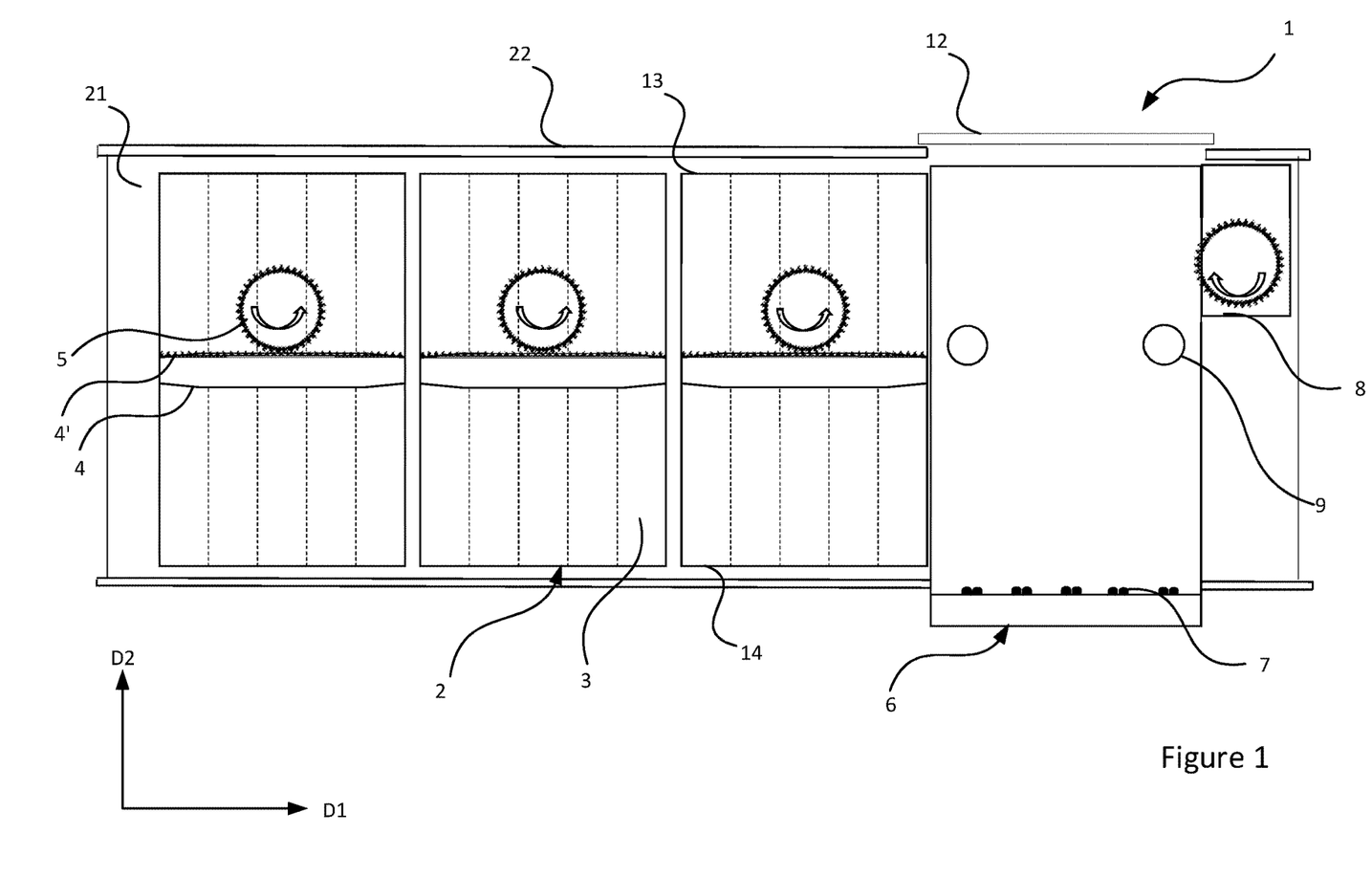
FIG. 1 illustrates an ejecting system 1 for dispensing countermeasure from a cut-out top cross sectional view in accordance with an embodiment of the present disclosure.

FIG. 1 illustrates an ejecting system 1 for dispensing countermeasure from a cut-out top cross sectional view.

The ejecting system 1 comprises at least one magazine 2 comprising at least one expendable cartridge 3, wherein each the at least one magazine 2 comprises a transporting rack 4 extending in a first direction D1. Further, the magazine feeding mechanism 5 is arranged to cooperate with said transporting rack 4 to move each of the at least one magazines 2 from a stored position to a loaded position. A loaded position may refer to that a magazine is held by a dispensing means 6. In FIG. 1, all magazines 2 are in a stored position. The ejecting system 1 also comprises a dispensing means 6 arranged to hold said at least one magazine 2 when said at least one magazine 2 is in a loaded position (not shown in FIG. 1, seen in FIG. 2).

In FIG. 1, the magazines 2 are all in a stored position (seen by that the dispensing means 6 is not holding a magazine 2). Further, the dispensing means 6 comprises an electrical connector arrangement 7 attachable to each of said at least one magazine 2. The ejecting system 1 further comprises a first positioning mechanism 8 arranged to move said dispensing means 6 and the at least one magazine 2 from the loaded position to a protruding position (shown in FIG. 3) allowing for dispensing countermeasures away from the ejecting system 1.

FIG. 1 further shows that the ejecting system 1 may be arranged inside a storage compartment 21 in a body 22 (of e.g. a vehicle) it should be noted that the ejecting system 1 is not necessary arranged in a compartment in a body 22. FIG. 1 shows that the storage compartment 21 also may comprise a hatch 12, enclosing at least the dispensing means 6 within said storage compartment 21, the hatch 12 being configured open in order to allow said dispensing means 6 to move into a protruded position (not shown in FIG. 1, seen in FIG. 3).

Upon transitioning said dispensing means 6 and the at least one magazine 2 from the loaded position to the protruding position the at least one magazine 2 moves along a second direction D2 essentially perpendicular to the first direction D1.

Figure 2:
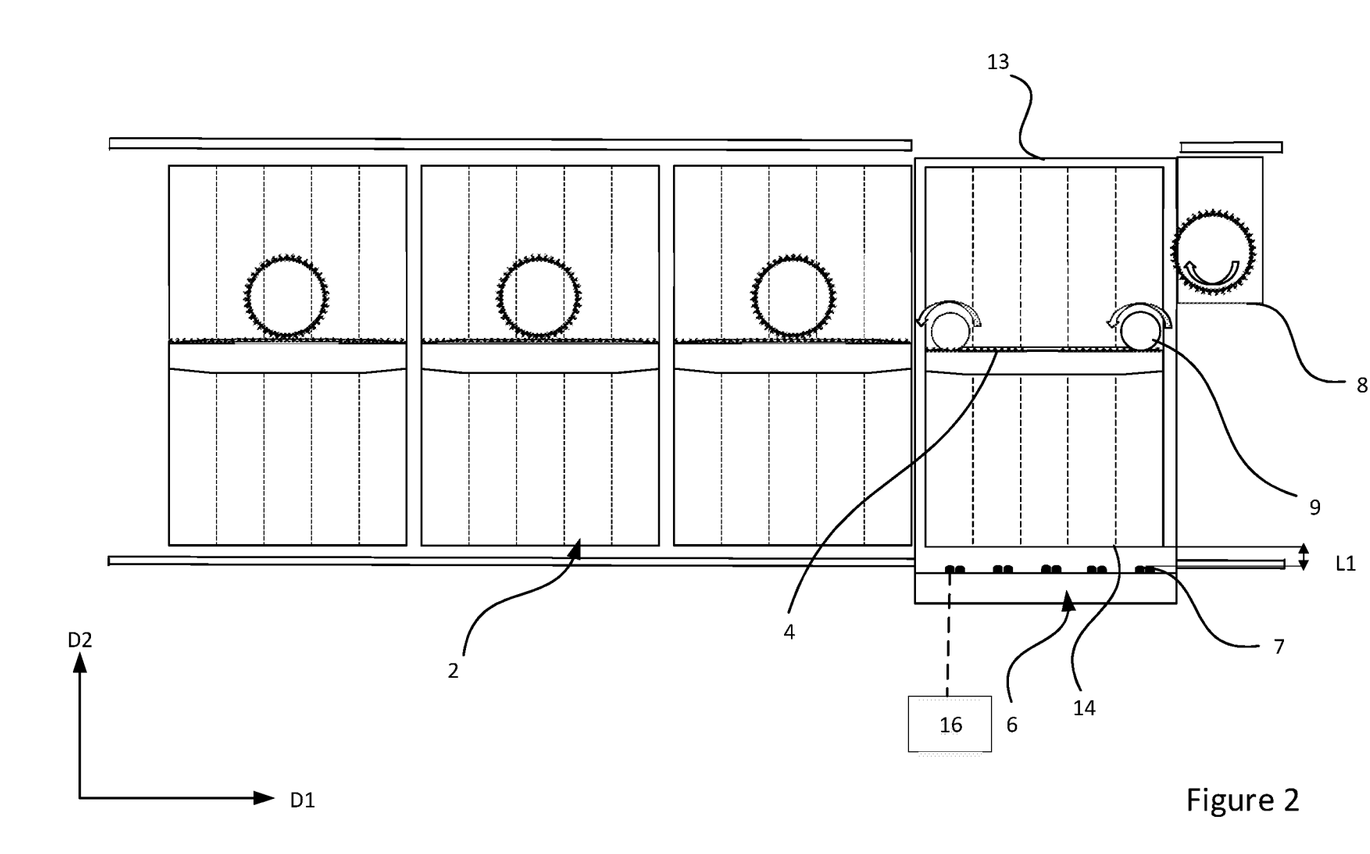
FIG. 2 illustrates an ejecting system 1 for dispensing countermeasure from a cut-out top cross sectional view, where a magazine 2 is in a loaded position in accordance with an embodiment of the present disclosure.

FIG. 2 illustrates an ejecting system 1 for dispensing countermeasure from a cut-out cross sectional view, wherein the ejecting system 1 comprises a plurality of magazines 2, wherein one magazine 2 is in a loaded position in the dispensing means 6.

FIG. 2 illustrates that the dispensing means 6 may comprise an eccentric mechanism 9 arranged to, by engaging to said transporting rack 4, attach said magazine 2 to said electrical connector arrangement 7. The dispensing means 6 may according to some embodiments comprise an eccentric mechanism 9 arranged to attach said magazine 2 to said electrical connector arrangement 7. When a magazine 2 is received by said dispensing means 6, there may be a spring mechanism (not shown) preventing the magazine 2 to attach to the connector arrangement 7. Accordingly, the eccentric mechanism 8 may apply a force to overcome said spring force in order to attach the magazine 2 to said connector arrangement 7. FIG. 2 shows that there is a distance L1, between the magazine 2 in the loaded position and the connector arrangement 7, thus the eccentric mechanism 9 has not yet applied a force so to attach the magazine to said connector arrangement 7.

FIGS. 1 and 2 shows that the magazine feeding mechanism 5 and said transporting rack 4 may cooperate/engage by means of a rack and pinion mechanism, wherein the magazine feeding mechanism 5 comprises at least one rotating pinion engaging with a corresponding linear gear 4' on said transporting rack 4.

Further, FIGS. 1 and 2 shows that each magazine 2 comprises a connector contact surface 14 and an opposing dispensing surface 13. The connector contact surface 14 is adapted to be attached to a connector arrangement 7 and the dispensing surface 13 may comprise launch openings so to dispense the expendable cartridges 3. It should be noted that each magazine may hold e.g. 1-50 expendable cartridges 3.

As further shown in FIG. 2, the electrical connector arrangement 7 comprises a plurality of electrical pins attachable to each of the plurality of expendable cartridges 3. In other words, at least one electrical pin is attachable to each expendable cartridge 2 in a magazine 2. A benefit of this is that it allows for flexibility in the ignition and individual monitoring of the expendable cartridges 3 in the magazine 2. The electrical connector arrangement 7 may be connected to control circuitry 16 configured to determine the amount of disposable cartridges 3 in a magazine 2. Further, control circuitry 16 may transmit ignition signals to ignite each expandable cartridge 3 separately. The control circuitry 16 may comprise, for example, one or more central processing units (CPUs), dedicated to performing calculations, and/or other processing devices.

As further shown in FIGS. 1 and 2, the at least one magazine 2 is, when in said storing position, arranged along a common row in a storage compartment 21 extending in said first direction D1 towards said dispensing means 6. However, the magazines 2 may be arranged in a plurality of rows according to some embodiments.

Figure 3:
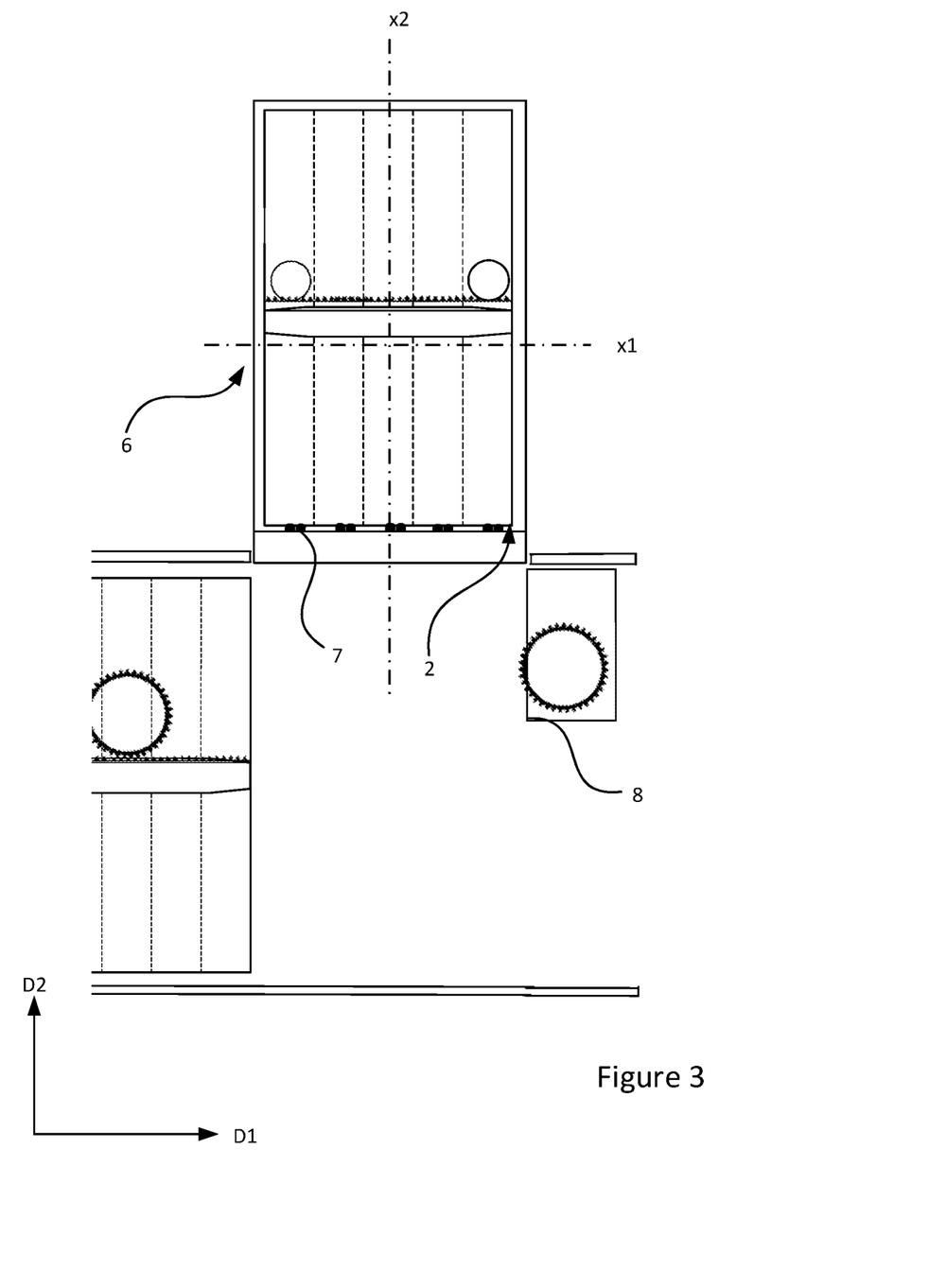
FIG. 3 illustrates an ejecting system 1 for dispensing countermeasure from a cut-out top cross sectional view, where a magazine 2 is in a protruded position in accordance with an embodiment of the present disclosure.

FIG. 3 illustrates an ejecting system 1 for dispensing countermeasure from a cut-out cross sectional view, wherein a magazine 2 and a dispensing means 6 are in a protruded position. Thus, the positioning mechanism 8 has moved the dispensing means 6 (and consequently the magazine 2) from a loaded position to a protruded position. Thus, the magazine 2 may in the protruded position perform a dispensing operation so to dispense countermeasures in said expandable cartridges.

The first positioning mechanism 8 may be arranged to retract the dispensing means 6 to an initial position after a dispensing operation so to allow additional of the plurality of magazines 2 to move from a stored position to a loaded position. Thus, allowing the dispensing means to be reloaded.

It is further shown in FIG. 3, that the eccentric mechanism 8 has attached the connector arrangement 7 to said contact surface 14 of the magazine 2, so to have an electrical contact with said expendable cartridges 3.

Figure 4:
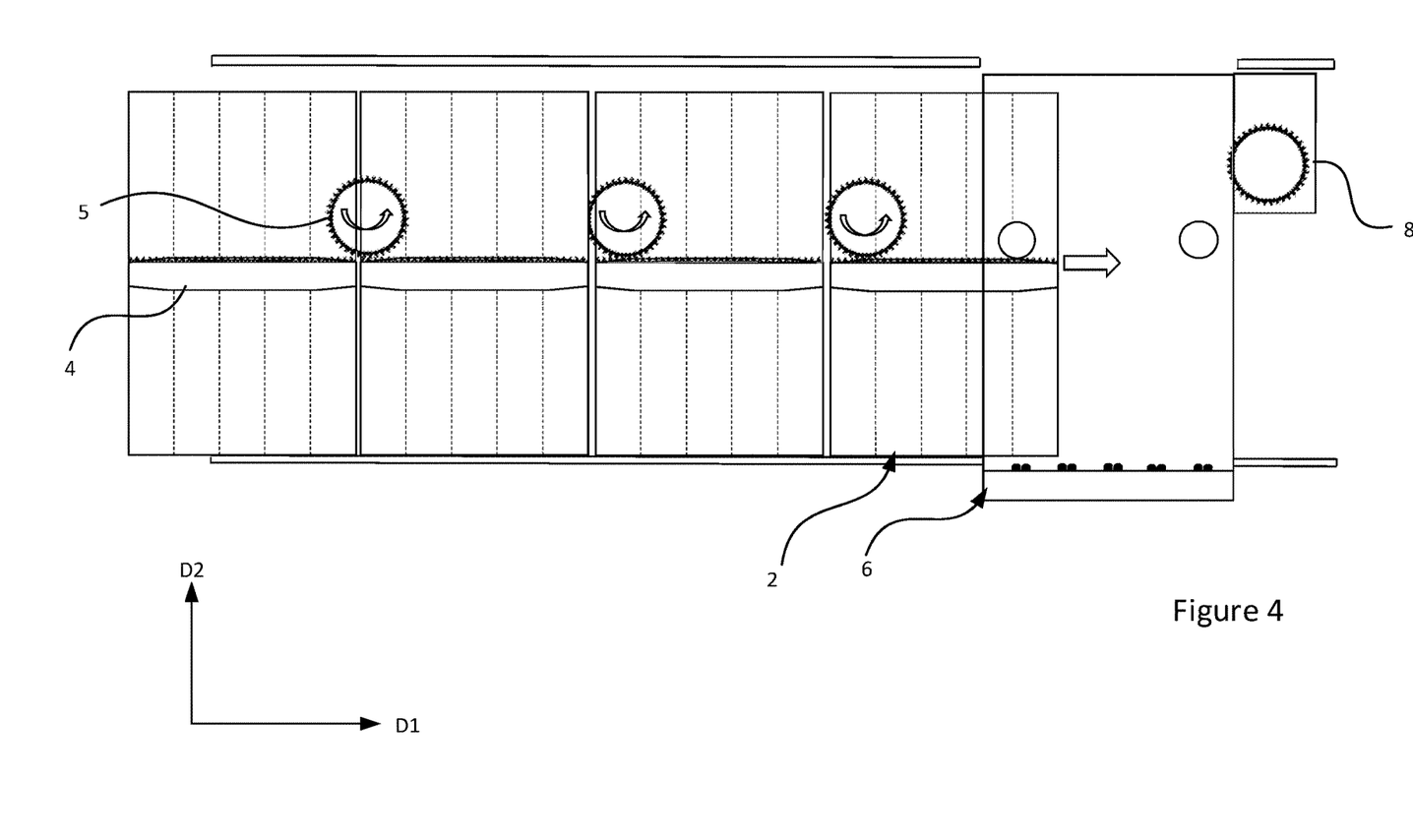
FIG. 4 illustrates an ejecting system 1 for dispensing countermeasure from a cut-out top cross sectional view, where a magazine 2 is transitioning from a stored position to a loaded position in accordance with an embodiment of the present disclosure.

FIG. 4 shows a cross sectional view of the ejecting system 1 where a magazine 2 is transitioning from a stored position to a loaded position by means of the transporting rack 4 engaging with the magazine feeding mechanism 5.

Figure 5:
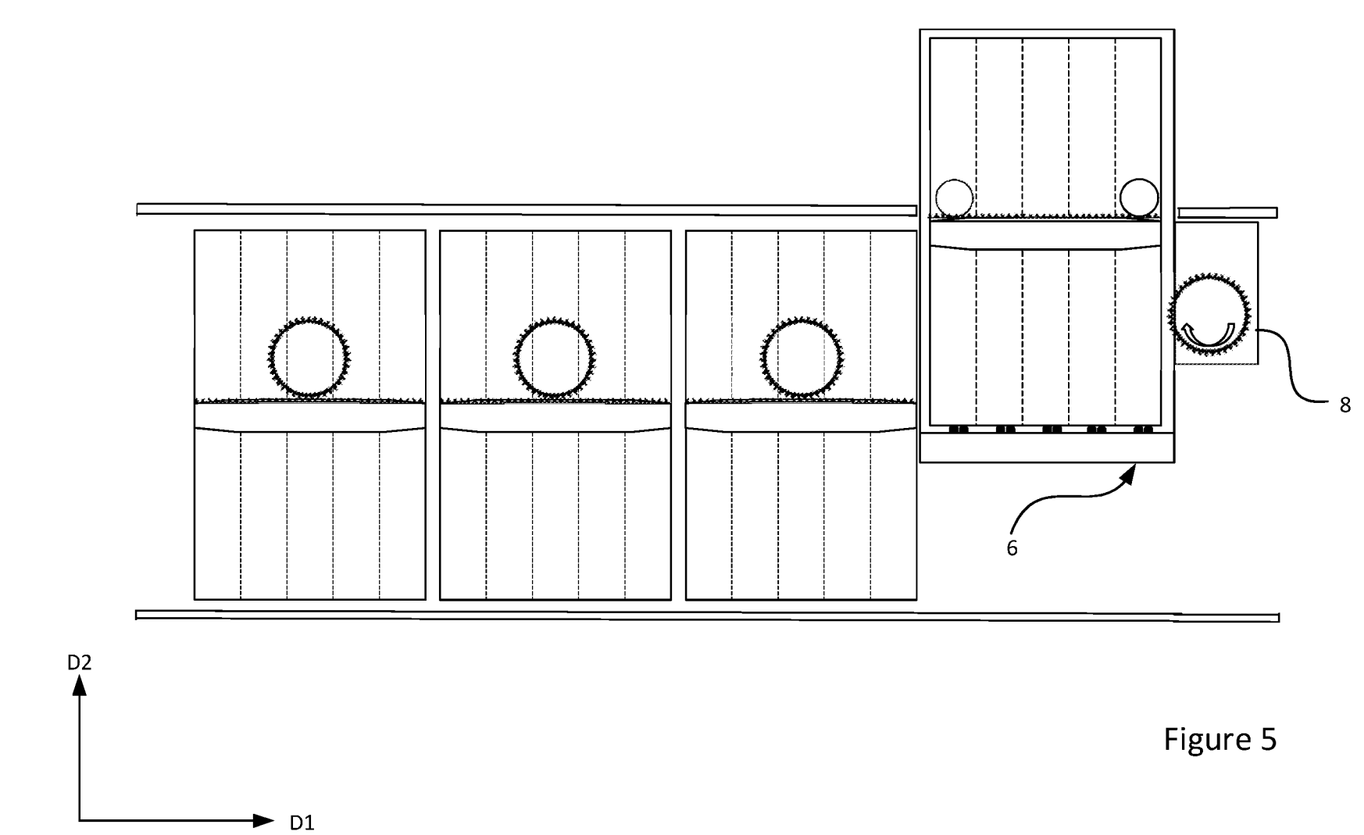
FIG. 5 illustrates an ejecting system 1 for dispensing countermeasure from a cut-out top cross sectional view, where a magazine 2 is transitioning from a loaded position to a protruded position in accordance with an embodiment of the present disclosure.

FIG. 5 shows a cross sectional view of the ejecting system 1 where the dispensing means 6 holding a magazine 2 is transitioning from a loaded position to a protruded position, by engagement of the first positioning mechanism 8 with said magazine 2.

Figure 6A:
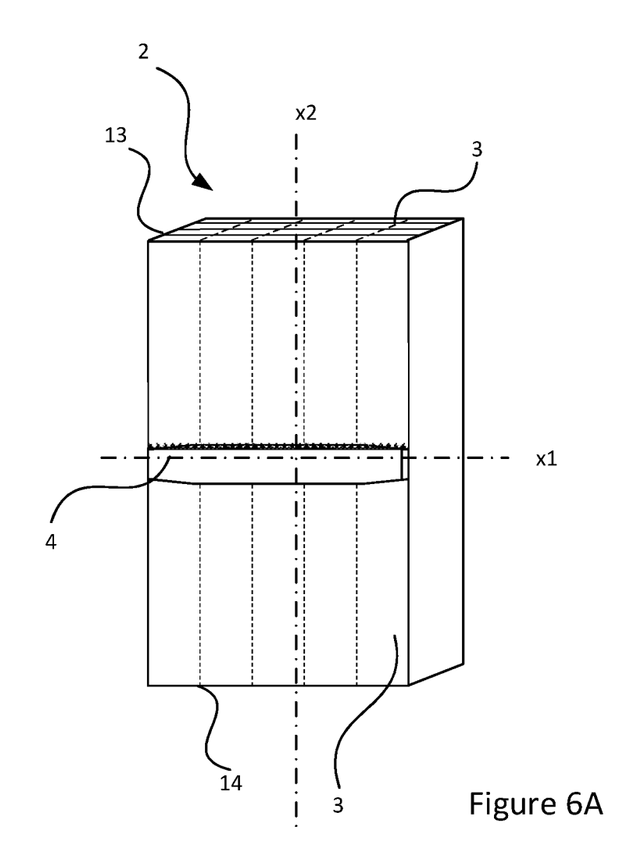
FIG. 6A illustrates an objective view of a magazine 2 comprising expendable cartridges 3 in accordance with an embodiment of the present disclosure.
Figure 6B:
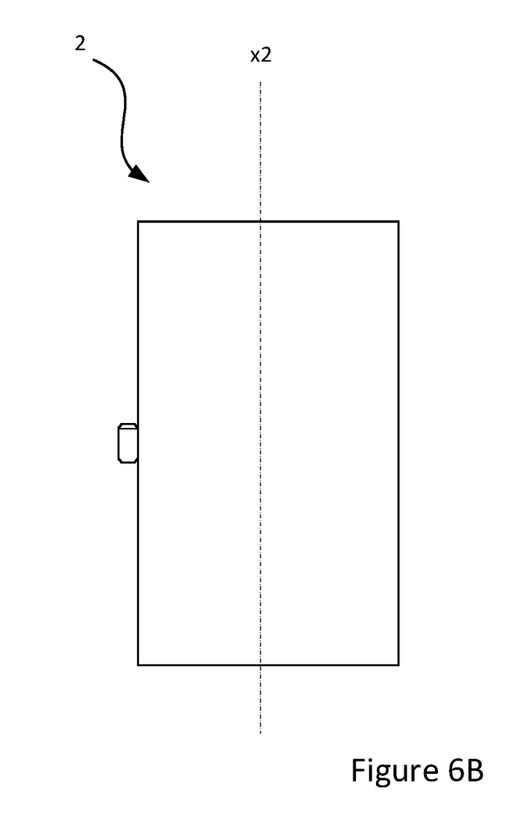
FIG. 6B illustrates a side view of a magazine 2 in in accordance with an embodiment of the present disclosure.

FIG. 6A illustrates an objective view of a magazine 3, showing that the magazine 2 comprises a first axis x1 extending along the first direction D1 and a second axis x2 extending in a second direction D2. FIG. 6B shows the magazine 2 in FIG. 6A from a side view.

Figure 7A:
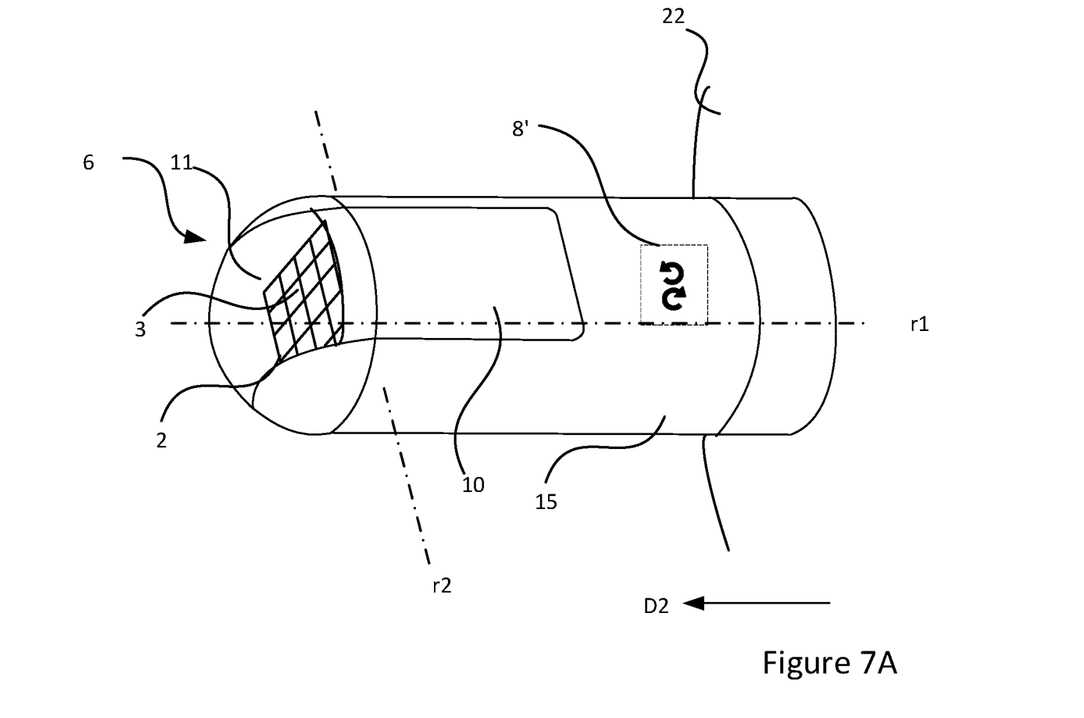
FIG. 7A illustrates an objective view of a dispensing means 6 in a protruded position holding a magazine 2 in in accordance with an embodiment of the present disclosure.
Figure 7B:
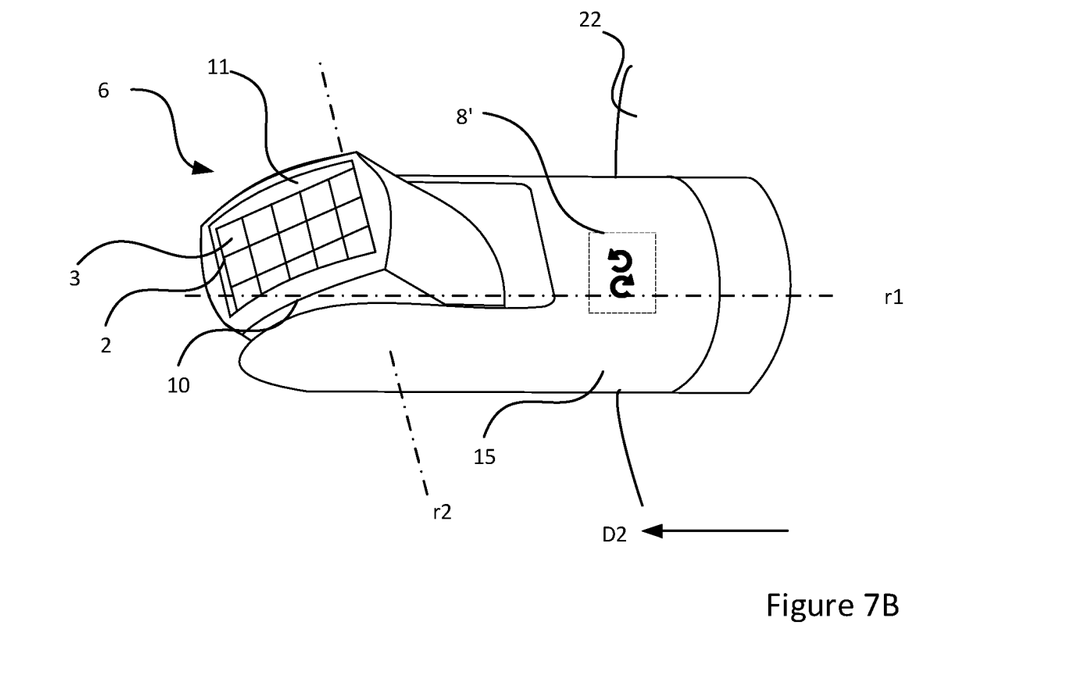
FIG. 7B illustrates an objective view of a dispensing means 6 in a protruded position holding a magazine 2 and wherein the dispensing means 6 has rotated around a second rotational axis r2 in accordance with an embodiment of the present disclosure.

FIGS. 7A and 7B shows objective views of the dispensing means in a protruded position (protruding form a body of e.g. a vehicle) in accordance with some aspects of the present disclosure. FIGS. 7A-7B shows that the dispensing means 6 may comprises a bracket 15 and a magazine housing 10 adapted to hold said magazine 2 (thus a magazine 2 in a loaded position), and wherein the magazine housing 10 is provided with a launch opening 11, wherein said second positioning mechanism 8' is arranged to rotate the bracket 15 with respect to a first rotational axis r1, and rotate the magazine housing 10 with respect to a second rotational axis r2.

In FIG. 7A, the bracket 15 and magazine housing 10 are not rotated around any axis, however in FIG. 7B the magazine housing 10 is rotated around the second rotational axis r2. Accordingly, said dispensing means 6 may be configured to, when in said protruding position, rotate said magazine 2 about at least one of the first and the second axis x1, x2 of the magazine. Further, the dispensing means 6 is when holding a magazine arranged so that the first rotation axis r1 is conjoined with the first axis x1 of the magazine, and such that the second rotational axis r2 is conjoined with the second axis x2 of the magazine.

Figure 8:
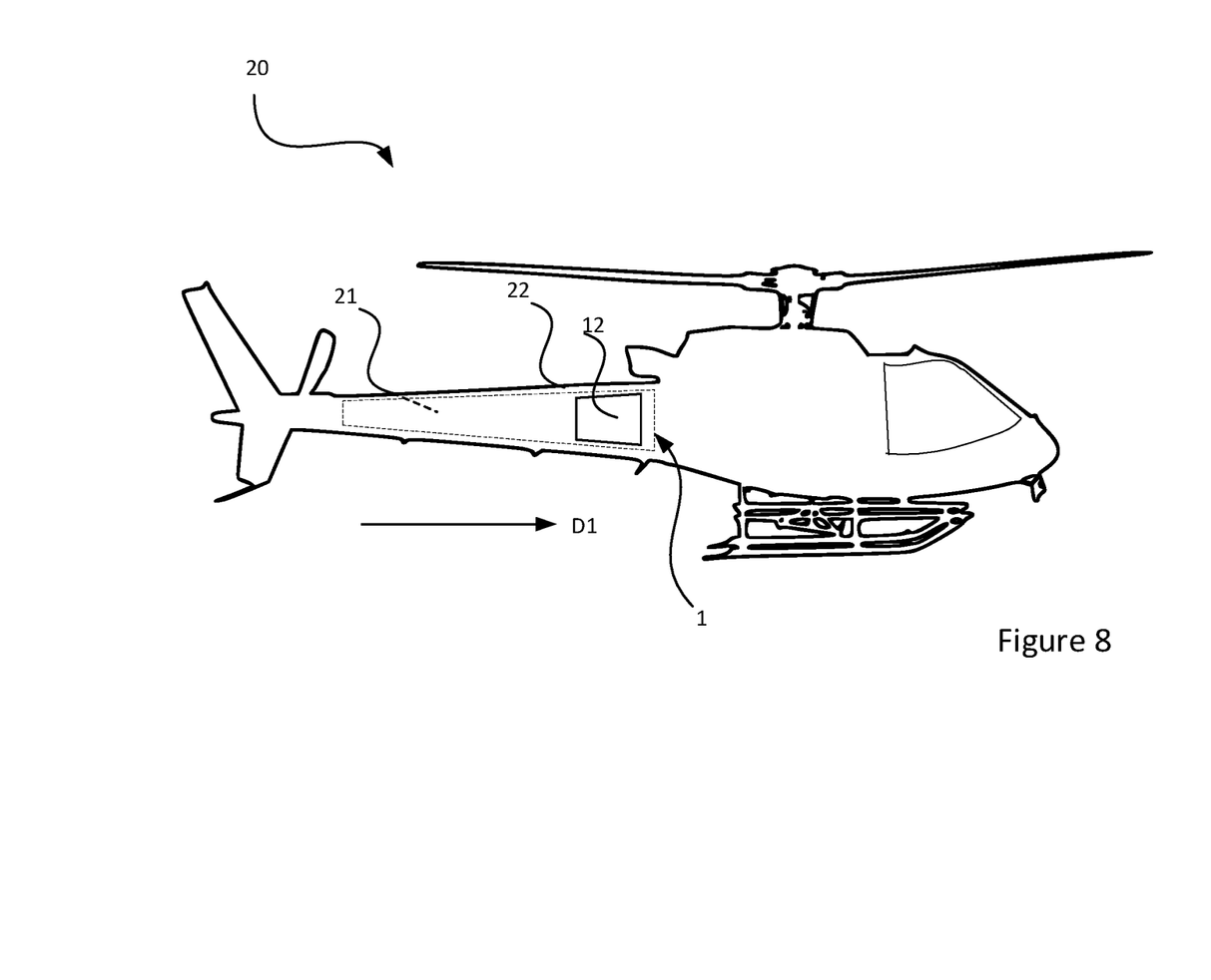
FIG. 8 illustrates a vehicle 20 comprising an ejecting system 1 in accordance with an embodiment of the present disclosure.

FIG. 8 shows a vehicle 12 comprising the ejecting system 1 in accordance with any of the aspects of the present disclosure. As seen in FIG. 8, the vehicle 20 is an airborne vehicle. However, the vehicle may be a ground-vehicle or a ship. Further, the ejecting system may be arranged in a fixed installation.

The magazines may be provided in a storage compartment 21 inside the body 22 of said vehicle 20 when in said storing position and in said loaded position, and wherein a magazine (and consequently at least a part of said dispensing system) protrude outwardly from an opening of said body 22 when in said protruded position.

As seen in FIG. 8, the opening may be enclosed by a hatch 12 when in said storing position and in said loaded position, wherein said hatch is opened in said protruded position.

Figure 9:
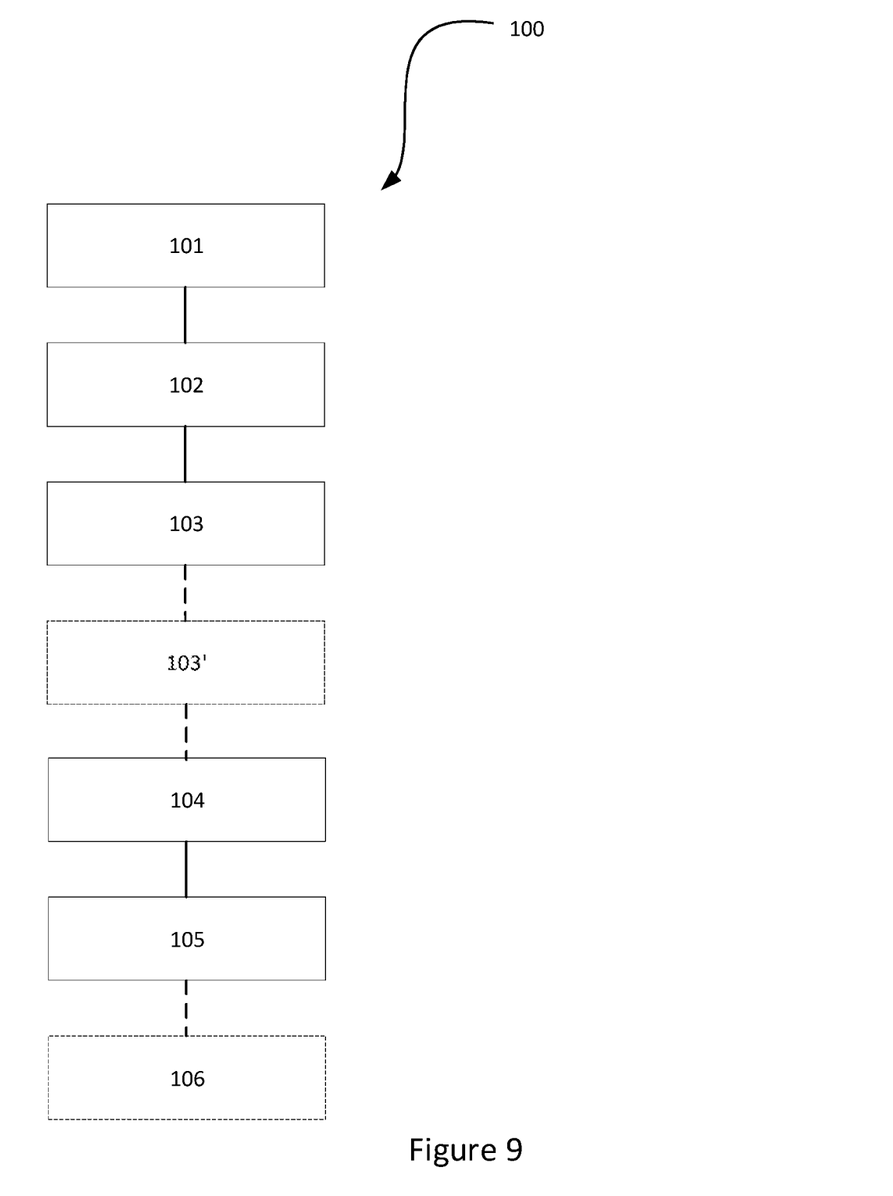
FIG. 9 illustrates a method 100 for preparing at least one magazine for a countermeasure operation from an ejecting system in accordance with the present disclosure.

FIG. 9 illustrates a method 100 for preparing at least one magazine for a countermeasure operation from an ejecting system in accordance with the present disclosure, wherein the method comprises the steps of actuating 101 the magazine feeding mechanism, so to transport the at least one magazine in a first direction. Further, the method comprises the step of receiving 102, in said dispensing means, the at least one magazine. Further, the method comprises the step of locking 103 the magazine in said dispensing means, wherein the electrical connector arrangement engages with said magazine. Further, the method comprises moving 104 the magazine, by means of said first positioning mechanism, to said protruded position. Further, when in said protruding position, the method 100 may in some aspects herein comprise the step of rotating 105 said magazine, by means of said dispensing mechanism, about at least one of a first and a second axis of the magazine (see e.g. FIG. 7B).

The method 100 may also comprise the step of preceding moving 104 the magazine to said protruding position, opening 103' a hatch enclosing said dispensing means within a compartment.

In some aspects of the method 100, the electrical connector arrangement may, after locking 103 or after rotating 105, control 106 (by means of the connector arrangement) the amount of disposable countermeasure cartridges in said magazine. Thus, if a dispensing means has performed a countermeasure operation previously without emptying all cartridges, the method 100 may control the amount of cartridges left to dispose in an upcoming countermeasure operation.

The invention claimed is:

1. An ejecting system (1) for dispensing countermeasure comprising:
   at least one magazine (2) comprising at least one expendable cartridge (3), wherein the at least one magazine (2) comprises a transporting rack (4) extending in a first direction (D1);
   a magazine feeding mechanism (5) arranged to cooperate with said transporting rack (4) to move the at least one magazine (2) from a stored position to a loaded position;
   a dispensing means (6) arranged to hold said at least one magazine (2) when said at least one magazine (2) is in said loaded position, wherein the dispensing means (6) comprises an electrical connector arrangement (7) attachable to said magazine (2); and
   a first positioning mechanism (8) arranged to move said dispensing means (6) and the at least one magazine (2) from the loaded position to a protruding position allowing for dispensing countermeasures away from the ejecting system (1).

2. The ejecting system (1) according to claim 1, wherein upon transitioning said dispensing means (6) and the at least one magazine (2) from the loaded position to the protruding position the at least one magazine (2) moves along a second direction (D2) essentially perpendicular to the first direction (D1).

3. The ejecting system (1) according to claim 1, wherein the dispensing means (6) comprises an eccentric mechanism (9) arranged to, by engaging to said transporting rack (4), attach said magazine (2) to said electrical connector arrangement (7).

4. The ejecting system (1) according to claim 1, wherein the dispensing means (6) comprises an eccentric mechanism (9) arranged to attach said magazine (2) to said electrical connector arrangement (7).

5. The ejecting system (1) according to claim 1, wherein the magazine feeding mechanism (5) and said transporting rack (4) cooperates by means of a rack and pinion mechanism, wherein the magazine feeding mechanism (5) comprises at least one rotating pinion engaging with a corresponding linear gear (4') on said transporting rack (4).

6. The ejecting system (1) according to claim 1, wherein each magazine (2) comprises a connector contact surface (14) and an opposing dispensing surface (13).

7. The ejecting system (1) according to claim 1, wherein each magazine (2) comprises a first axis (x1) extending along the first direction (D1) and a second axis (x2) extending in a second direction (D2), wherein said dispensing means (6) comprises a second positioning mechanism (8') configured to, when in said protruding position, rotate said magazine (2) about at least one of the first and the second axis (x1, x2).

8. The ejecting system (1) according to claim 7, wherein the dispensing means (6) comprises a bracket (15) and a magazine housing (10) adapted to hold said magazine (2), and wherein the magazine housing (10) is provided a launch opening (11), wherein the second positioning mechanism (8') is arranged to rotate the bracket (15) with respect to a first rotational axis (r1), and rotate the magazine housing (10) with respect to a second rotational axis (r2).

9. The ejecting system (1) according to claim 1, wherein the first positioning mechanism (8) is arranged to retract the dispensing means (6) to an initial position after a dispensing operation so to allow additional of the at least one magazine (2) to move from a stored position to a loaded position.

10. The ejecting system (1) according to claim 1, wherein the at least one expendable cartridge (3) is a plurality of expendable cartridges (3), wherein the electrical connector arrangement (7) comprises a plurality of electrical pins attachable to each of the plurality of expendable cartridges (3).

11. The ejecting system (1) according to claim 1, wherein the at least one expendable cartridge (3) comprises expendable countermeasure.

12. The ejecting system (1) according to claim 1, wherein the at least one magazine (2) is, when in said storing position, arranged along a common row in a storage compartment (21) extending in said first direction (D1) towards said dispensing means (6).

13. The ejecting system (1) according to claim 1, wherein said ejecting system (1) is fully enclosed in a storage compartment (21), wherein said storage compartment (21) comprises a hatch (12), enclosing at least the dispensing means (6) within said storage compartment (21), the hatch (12) being configured to open in order to allow said dispensing means (6) to move into a protruded position.

14. A vehicle (20) comprising the ejecting system (1) in accordance with claim 1.

15. The vehicle (20) according to claim 14, wherein said magazines (2) are provided in a storage compartment (21) inside the body (22) of said vehicle (20) when in said storing position and in said loaded position, and wherein a magazine (2) protrude outwardly from an opening of said body (22) when in said protruded position.

16. The vehicle (20) according to claim 15, wherein said opening is enclosed by the hatch (12) when in said storing position and in said loaded position, wherein said hatch is opened in said protruded position.

17. The vehicle (20) according to claim 14, wherein the vehicle is an airborne vehicle.

18. A method (100) for preparing at least one magazine for a countermeasure operation from the ejecting system of claim 1, the method comprising the steps of:
   actuating (101) the magazine feeding mechanism, so to transport the at least one magazine in a first direction;
   receiving (102), in said dispensing means, the at least one magazine;
   locking (103) the magazine in said dispensing means, wherein the electrical connector arrangement engages with said magazine;
   moving (104) the magazine, by means of said first positioning mechanism, to said protruded position; and
   rotating (105) said magazine, by means of said dispensing mechanism, about at least one of a first and a second axis of the magazine.

19. The method (100) according to claim 18, further comprising the step of, preceding moving (104) the magazine to said protruding position, opening (103') a hatch enclosing said dispensing means within a compartment.

20. The ejecting system (1) according to claim 12, wherein said ejecting system (1) is fully enclosed in the storage compartment (21), wherein said storage compartment (21) comprises a hatch (12), enclosing at least the dispensing means (6) within said storage compartment (21), the hatch (12) being configured to open in order to allow said dispensing means (6) to move into a protruded position.

* * * * *